United States Patent
Lee

(12) 
(10) Patent No.: US 6,334,838 B1
(45) Date of Patent: Jan. 1, 2002

(54) EXERCISING CART STRUCTURE

(76) Inventor: James Lee, No. 116, Chung Shan Rd. Sect. 1, Chung Chuang Village, Hua Tarn Hsiang, Changhua Hsien (TW)

( * ) Notice: Subject to any disclaimer, the term of this patent is extended or adjusted under 35 U.S.C. 154(b) by 0 days.

(21) Appl. No.: 09/704,619

(22) Filed: Nov. 3, 2000

(51) Int. Cl.$^7$ .............................. A63B 23/00; B62M 1/00
(52) U.S. Cl. ........................... 482/51; 280/265; 280/221; 280/254
(58) Field of Search .......................... 280/87.041, 11.23, 280/87.03, 267, 224, 254, 11.19, 265, 87.043, 11.115, 221; 482/57, 51, 52, 53, 66, 68

(56) References Cited

U.S. PATENT DOCUMENTS

| | | | | |
|---|---|---|---|---|
| 4,411,442 A | * | 10/1983 | Rills | 280/221 |
| 4,515,362 A | * | 5/1985 | Lin | 272/114 |
| 4,861,054 A | * | 8/1989 | Spital | 280/221 |
| 6,131,933 A | * | 10/2000 | Fan | 280/265 |
| 6,142,493 A | * | 11/2000 | Wang et al. | 280/41 |

* cited by examiner

*Primary Examiner*—Stephen R. Crow
(74) *Attorney, Agent, or Firm*—Bacon & Thomas PLLC

(57) ABSTRACT

An exercising cart structure. The structure includes a cart body, a front wheel steering unit, a driving wheel unit, a chain and a rear wheel unit. The front wheel steering unit is installed on a front section of the cart body. The driving wheel unit is installed on a middle section of the cart body. The rear wheel unit is mounted on a rear section of the cart body. The rear wheel unit via the chain is drivingly connected to the driving wheel unit. The driving sprocket of the driving wheel unit and the transmissions gears are mounted on the main and subsidiary supporting racks of the cart body. The chain is connected between the driving sprocket and the driven sprocket of the rear wheel unit.

1 Claim, 6 Drawing Sheets

EXERCISING CART STRUCTURE

BACKGROUND OF THE INVENTION

1. Field of the Invention

The present invention relates to an exercising cart structure which not only can achieve an entertaining function, but also enables a user to stably exercise by treading the pedals with strength saved.

2. Description of the Related Art

FIG. 1 shows an existent handle-controlled skate board which includes a frame body 10, two torque springs 20, two levers 30 and two pedals 40. A handle 12 is mounted on a stem 11 of front side of the frame body 10. A front fork 13 is disposed on lower side of the stem 11. A front wheel 14 is mounted on the front fork 13. A retaining shaft 15 having a locating hole 151 is disposed on a middle section of the frame body 10 near front side thereof. A base board 16 is disposed behind the retaining shaft 15. A rear wheel 17 is mounted on rear side of the frame body 10. A ratchet 18 is mounted on each of two sides of the rear wheel 17. The two levers 30 are symmetrically arranged. A tubular section 31 is disposed at front end of each lever 30. A middle section of the lever 30 is upward inclined by a certain angle. Two laterally extending fixing lugs 32 having locking holes 321 are disposed on two sides of the lever 30. A U-shaped channel seat 33 downward extends from rear end of the lever 30. Referring to FIG. 2, the channel seat 33 is formed with several perforations 331 at equal intervals. A shaft pin 34 is passed through each perforation 331 to pivotally connect a driving block 35 in the channel seat 33. An outer side of the driving block 35 is formed with a pivot hole 351 for the shaft pin 34 to pass therethrough. An inner upper side of the driving block 35 is formed with an leaning face 352 for engaging with a bottom face of the channel seat 33. A lower side of the driving block 35 is formed with an escape face 353. An outer lower side of the driving block 35 is formed with a wedge angle 354. The pedal 40 is formed with through holes 41.

When assembled, as shown in FIG. 3, the two torque springs 20 are fitted on the retaining shaft 15 of the frame body 10 with one end of the torque spring 20 positioned on the frame body 10. Then the tubular sections 31 of the two levers 30 are respectively fitted around the retaining shaft 15 of the frame body 10 on outer sides of the torque springs 20. The other end of the torque spring 20 is positioned under the lever 30, whereby the lever 30 is lifted to lean against the lower side of the base board 16 of the frame body 10. Under such circumstance, the channel seat 33 at the rear end of the lever 30 is right positioned above the ratchet 18 of rear side of the frame body 10. Then an insertion pin is inserted into the locating hole 151 to fix the torque springs 20 and the levers 30. Finally, screws are passed through the through holes 41 of the pedals 40 to lock the pedals 40 at the locking holes 321 of the lugs 32 of the levers 30. At this time, the assembly is completed.

The above conventional structure has some shortcomings as follows:

1. A user stands on the base board 16 of the frame body 10 to alternately step on the pedals 40 and the levers 30. At this time, the leaning faces 352 of the driving blocks 35 at rear end of the lever 30 abut against the bottom face of the channel seat 33 and the wedge angles 354 on outer side drive the ratchets 18 on two sides of the rear wheel 17 so as to rotate the rear wheel 17 and make the skate board move forward. When stepping onto the pedals 40, a swinging force is exerted onto two sides of the skate board. Moreover, the skate board is equipped with only one single front wheel 14 and one single rear wheel 17 so that it is hard to keep the skate board balanced and ride the skate board stably. It often takes place that a not experienced rider falls down when riding the skate board.

2. The lever 30 swings with only one end thereof fixed on the retaining shaft 15. Therefore, the lifted rear end of the lever 30 tends to displaced and collided. This often deflects the U-shaped channel seat 33 from the ratchet 18 and leads to difficulty in matching the driving block 35 with the ratchet 18.

3. The ratchets 18 are fixed on two sides of the rear wheel 17 and exposed to outer side. A user or other people may incautiously touch the ratchets 18 and get hurt.

4. The torque springs 20 resiliently keep the levers 30 lifted.

After a period of use, the resilience of the torque springs 20 will fail. This deteriorates the operation of the levers 30.

SUMMARY OF THE INVENTION

It is therefore a primary object of the present invention to provide an exercising cart structure in which the transmission gears of the driving wheel unit are engaged with the rack downward extending from the pedal on entire tooth face so that the engaged tooth faces will not be displaced and deflected.

It is a further object of the present invention to provide. the above exercising cart structure in which the rack of the pedal is able to directly rotates the transmission gears. Moreover, the guide rod of the main supporting rack is passed through the guide arch slot of the rack so that the travel of the pedal is limited within a safe range.

It is still a further object of the present invention to provide the above exercising cart structure in which the exercising cart is equipped with two front wheels and two rear wheels so that the exercising cart stably touches the ground at four points. Therefore, when treading the exercising cart and a laterally swinging force is exerted thereonto, the exercising cart is still stably supported without possibility of turning over.

It is still a further object of the present invention to provide the above exercising cart structure in which the oil pressure cylinders are mounted under the pedals for restoring the pedals. In addition, the oil pressure cylinders serve to exercise the feet of the user when treading down the pedals. Therefore, the exercising cart not only can achieve an entertaining function, but also can achieve a treading exercising function with strength saved.

The present invention can be best understood through the following description and accompanying drawings wherein:

DETAILED DESCRIPTION OF THE PREFERRED EMBODIMENT

Figure 1:
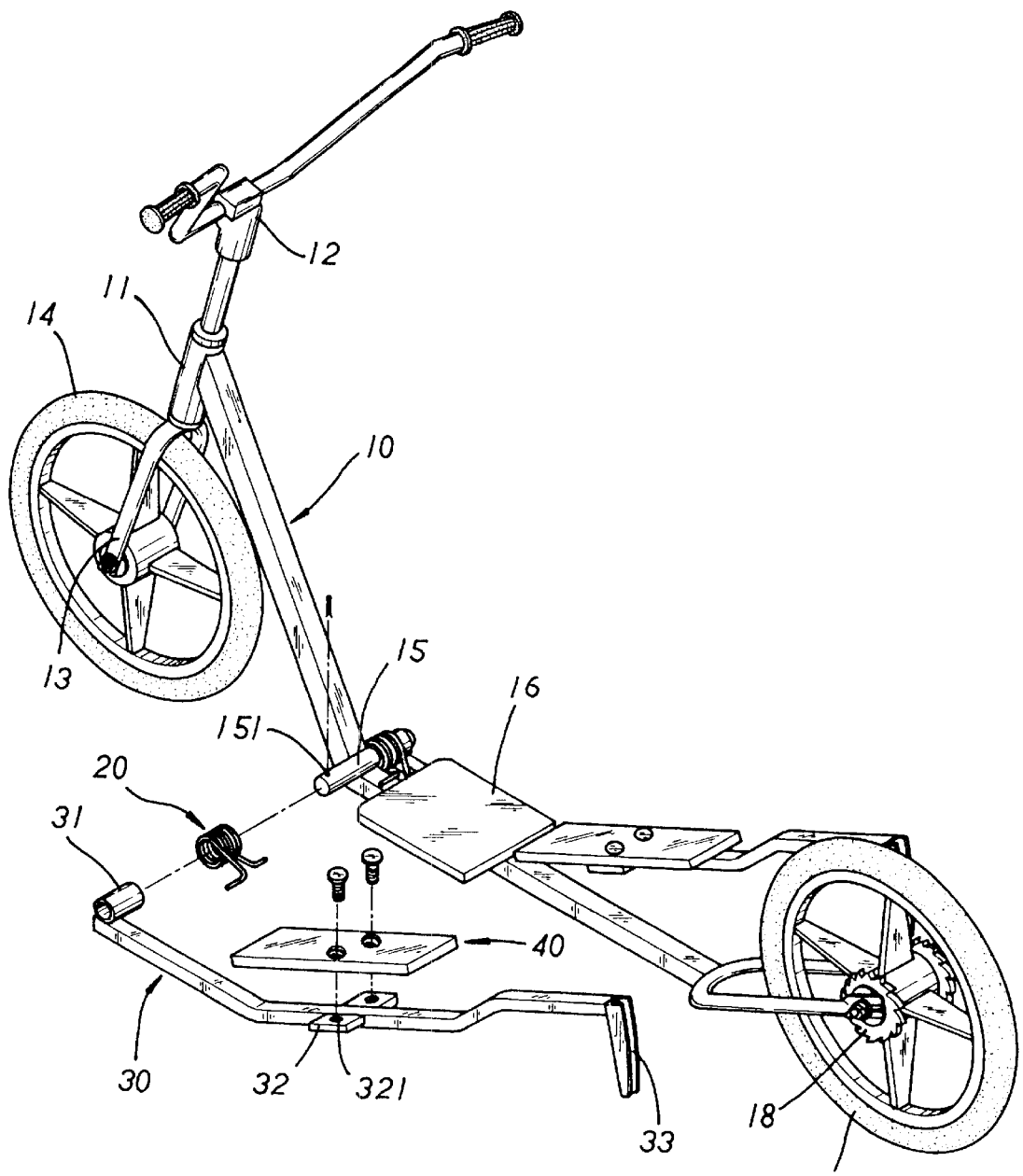
FIG. 1 is a perspective exploded view of a conventional handle-controlled skate board.
Figure 2:
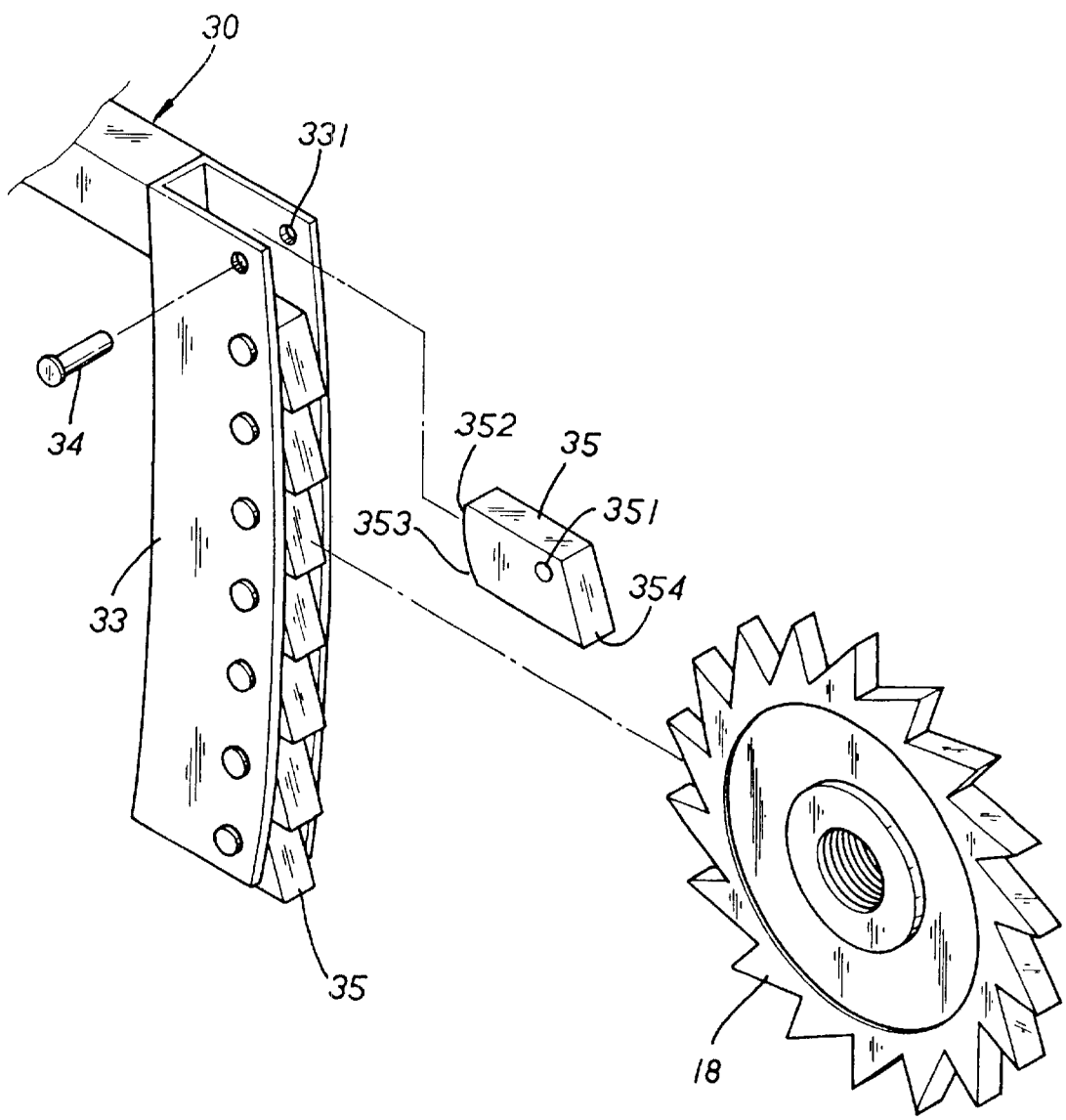
FIG. 2 is an enlarged view of the channel seat of the end of the lever of the conventional handle-controlled skate board.
Figure 3:
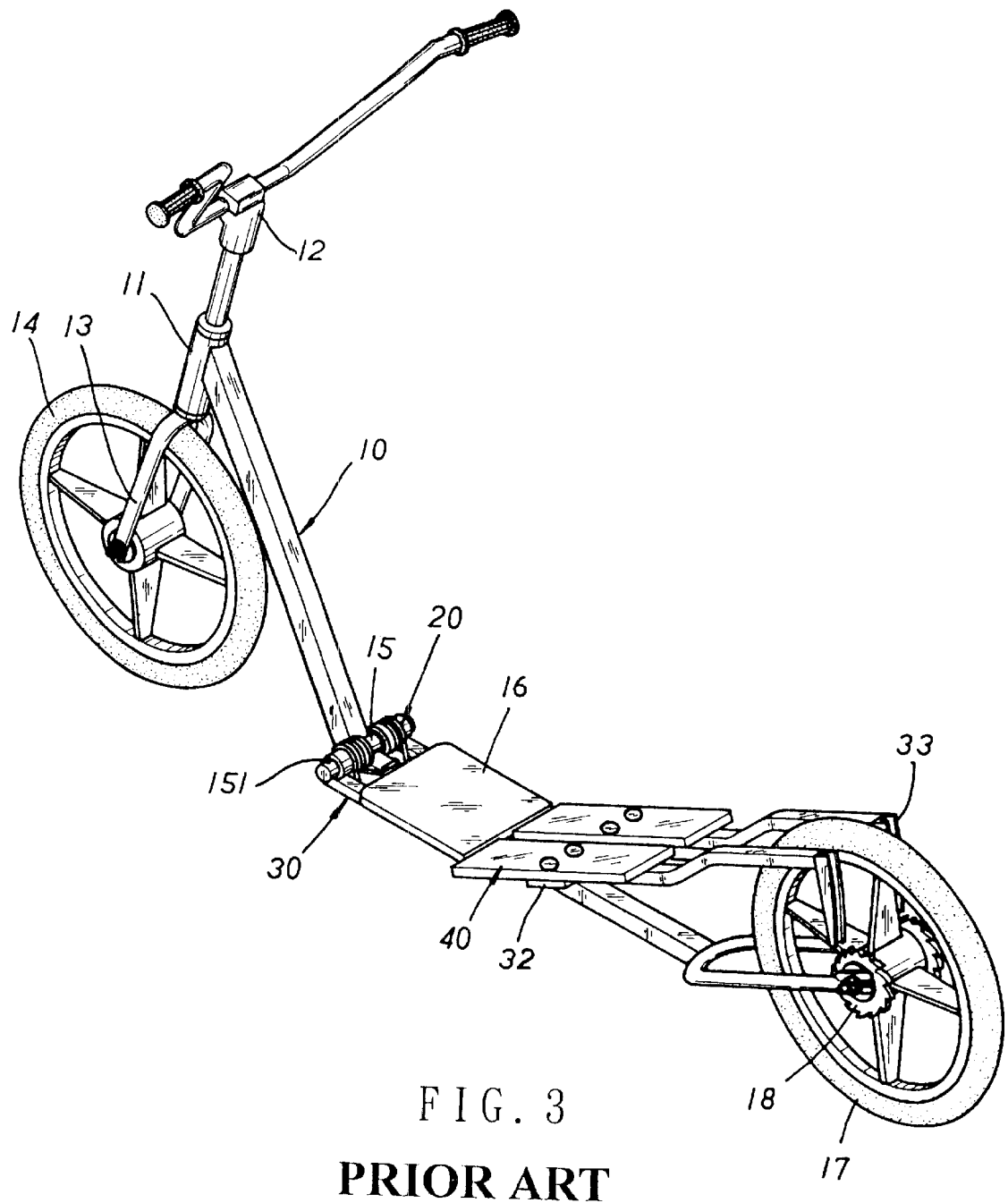
FIG. 3 is a perspective assembled view of the conventional handle-controlled skate board.
Figure 4:
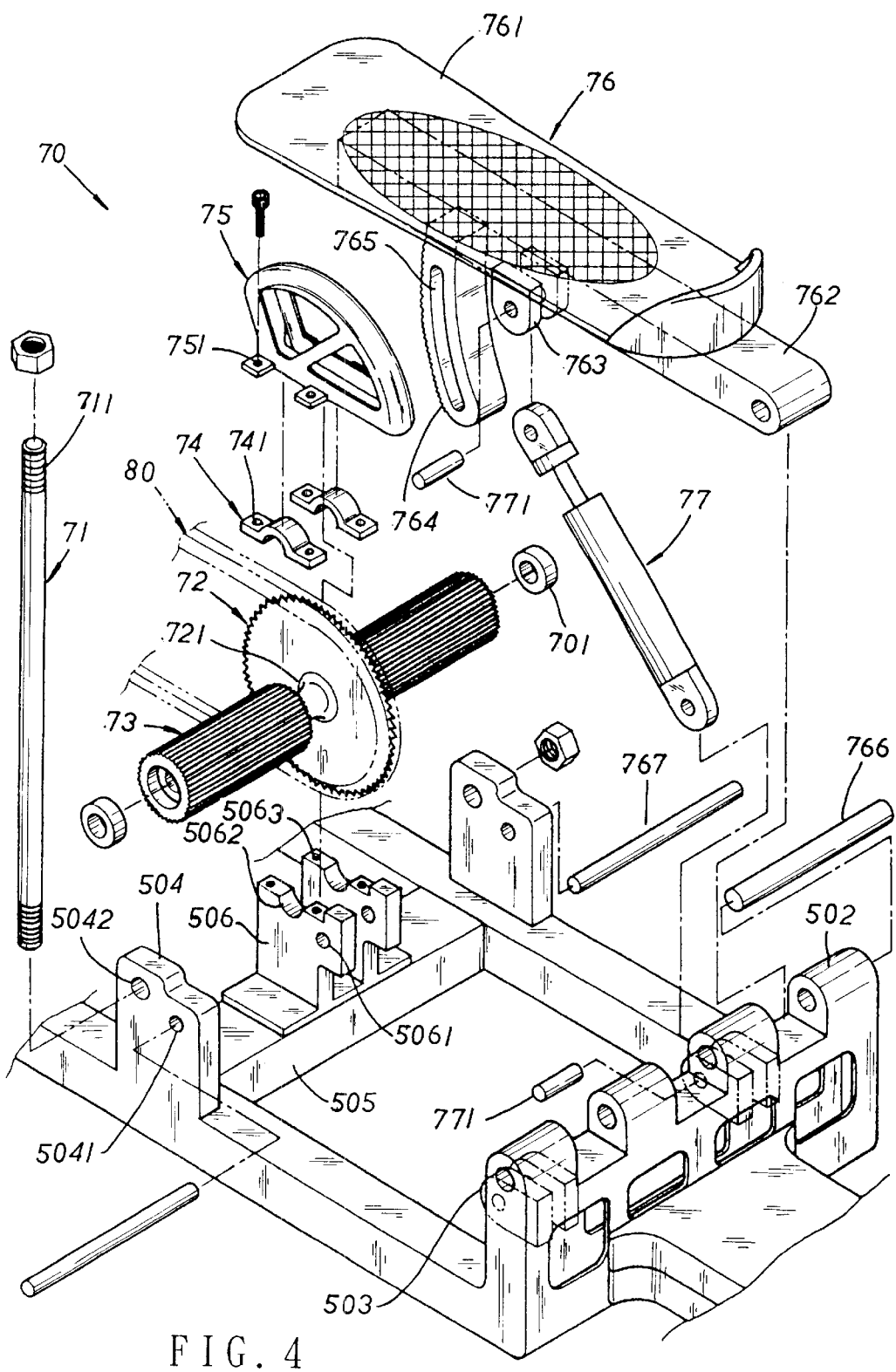
FIG. 4 is a perspective exploded view of the exercising cart of the present invention.
Figure 5:
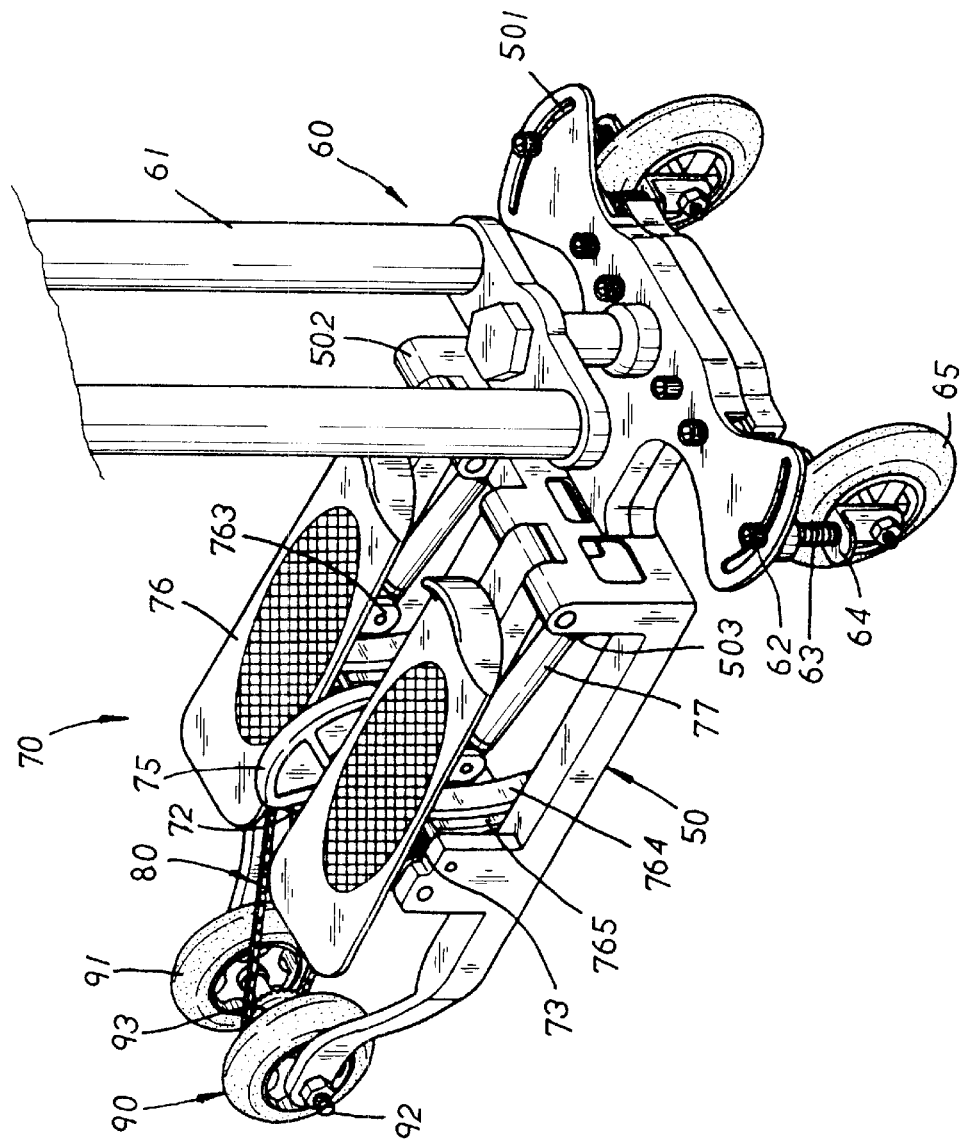
FIG. 5 is a perspective assembled view of the exercising cart of the present invention.

Please refer to FIGS. 4 and 5. The present invention includes a cart body 50, a front wheel steering unit 60, a driving wheel unit 70, a chain 80 and a rear wheel unit 90. The front wheel steering unit 60 is installed on front section of the cart body 50. The driving wheel unit 70 is installed on middle section of the cart body 50. The rear wheel unit 90 is mounted on rear section of the cart body 50. The rear wheel unit 90 via the chain 80 is drivingly connected with the driving wheel unit 70.

Two sides of front section of the cart body 50 are respectively formed with two guide arch slots 501. The front side of the middle section of the cart body 50 is elevated. Two pedal pivot seats 502 each having a pivot hole are disposed on two sides of upper end. Two oil pressure pivot seats 503 each having a pivot hole are respectively disposed on two sides of rear face. Two main supporting racks 504 are respectively disposed on two sides of rear portion of middle section. A transverse reinforcing beam 505 is disposed between the main supporting racks 504. Two subsidiary supporting racks 506 are additionally disposed at a middle section of the reinforcing beam 505. The front side of each of the main and subsidiary supporting racks 504, 506 is formed with a guide rod through hole 5041, 5061. The rear side of the main supporting rack 504 is formed with a pivot rod through hole 5042. The rear side of upper end face of the subsidiary supporting rack 506 is formed with a sprocket notch 5062. The front and rear sides of the sprocket notch 5062 are respectively formed with two thread holes 5063. The front wheel steering unit 60 includes a handle 61 which drivingly controls two front wheels 65 supported by bolts 62, shock springs 63 and wheel brackets 64. The bolts 62 are passed through the guide arch slots 501 of the cart body 50 and restricted within a certain turning range. The driving wheel unit 70 is composed of two bearings 701, a central pivot rod 71, a driving sprocket 72, two transmission gears 73, two fasteners 74, a sprocket cover 75, two pedals 76, two pedal pivot rods 766, two guide rods 767, two oil pressure cylinders 77 and four oil pressure pivot rods 771. Each of two ends of the central pivot rod 71 is formed with a locking thread section 711. The two transmission gears 73 are independently mounted on two sides of the center of the driving sprocket 72 via fly wheels 721. When a user moves the gravity center of his/her body and alternately steps onto the pedals, the transmission gears 73 forwardly operates to drive the driving sprocket 72 to move forward. When the operation is reversed (backward), the driving sprocket 72 idles. The two independent transmission gears 73 will not interfere with each other. The bearings 701 are disposed at outer end sections of the transmission gears 73. The fastener 74 is arch bridge-shaped and formed with locking holes 741 at two ends. The sprocket cover 75 is arched with its opening facing downward. Two sides of the open end of the sprocket cover 75 are formed with locking holes 751. A base seat 762 extends from front end of bottom side of the step face 761 of the pedal 76. The base seat 762 has a pivot hole at end section. A pair of oil pressure pivot seats 763 having pivot holes downward project from middle section of the base seat 762. An arch rack 764 is disposed behind the oil pressure pivot seats 763. The arch rack 764 is formed with a central guide arch slot 765. A driven sprocket 93 is disposed on a wheel shaft 92 connected with the rear wheels 91 of the rear wheel unit 90.

When assembled, as shown in FIG. 5, the driving sprocket 72 of the driving wheel unit 70 is supported in the sprocket notches 5062 of the two subsidiary supporting racks 506 of the cart body 50. The fasteners 74 and the sprocket cover 75 are then locked to cover the driving sprocket 72. Then the central pivot rod 71 is passed through the pivot rod through hole 5042 of the cart body 50 and the driving sprocket 72 and the two transmission gears 73. Two ends of the central pivot rod 71 are then locked to rotatably fix the driving sprocket 72 and the two transmission gears 73. The pedal pivot rod 766 is passed through the pivot holes of the base seat 762 to pivotally connect the pedal 76 at the pivot holes of the pedal pivot seats 502 of the cart body 50. One end of the oil pressure cylinder 77 via the oil pressure pivot rod 771 is pivotally connected at the pivot holes of the oil pressure pivot seats 503 of the cart body 50. The other end thereof via the oil pressure pivot rod 771 is also pivotally connected at the pivot holes of the oil pressure pivot seats 763 of the pedal 76. Then the guide rod 767 is passed through the guide rod through hole 5041 of the main supporting rack 504 and through the guide arch slot 765 of the rack 764 of the pedal 76 to be fixed at the guide rod through hole 5061 of the subsidiary supporting rack 506. Finally, the chain 80 is installed between the driving sprocket 72 of the driving wheel unit 70 and the driven sprocket 93 of the rear wheel unit 90 to complete the assembly.

Figure 6:
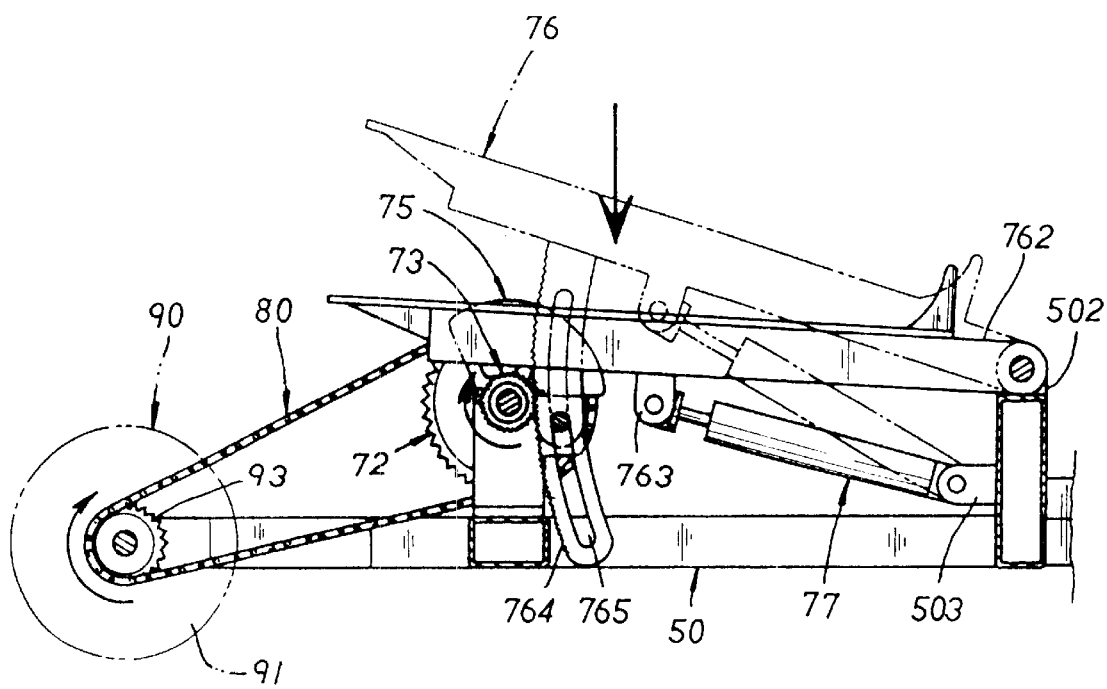
FIG. 6 shows the treading operation and forward movement of the exercising cart of the present invention.

FIG. 6 shows the operation of the present invention. When one pedal 76 is trod down, the gravity center of the user's body falls onto the force application point of the pedal 76. At this time, the oil pressure cylinder 77 is pressed and retracted and the rack 764 under the pedal 76 will move along the guide rod 767 to forward rotate the transmission gears 73 which further drive the driving sprocket 72. Via the chain 80, the driving sprocket 72 drives the driven sprocket 93 to drive the rear wheels 91 to forward rotate. When the other pedal 76 is trod down, the gravity center of the user's body is moved to the foot applying force onto the pedal 76 and the other foot is relaxed. At this time, the transmission gears 73 forwardly operate to drive the driving sprocket 72 to move forward. The reverse operation (backward) will lead to idling. The two independent transmission gears 73 will not interfere with each other. The oil pressure cylinder 77 under the forced pedal 76 will be pressed and retracted, while the oil pressure cylinder 77 under the released pedal 76 will extend and restore so as to reversely upward push the pedal 76 along the transmission gears 73 and restore the pedal 76 to its home position. Accordingly, by means of alternately moving the gravity center of the user's body and treading the pedals, the exercising cart can move forward.

According to the above arrangement, the present invention has the following advantages:

1. The transmission gears 73 of the driving wheel unit 70 are engaged with the rack 764 of the pedal 76 on entire tooth face so that the engaged tooth faces will not be displaced and deflected. By means of alternately treading the pedals 76, the racks 764 can rotate the transmission gears 73 to drive the driving sprocket 72 which further drives the driven sprocket 93 of the rear wheel unit 90 for moving the rear wheels 91 forward. This achieves a stable exercising effect.
2. The rack 764 of the pedal 76 rotates the transmission gear 73 when the pedal 76 is trod down. The guide rod 767 of the main supporting rack 504 is passed through the guide arch slot 765 so that the travel of the pedal 76 is limited within a safe range. Therefore, the safety in treading operation is ensured.
3. The exercising cart is equipped with two front wheels 65 and two rear wheels 91 so that the exercising, cart stably touches the ground at four points. Therefore, when treading the exercising cart and a laterally swinging force is exerted there onto, the exercising cart is still stably supported without possibility of turning over.

4. The oil pressure cylinders 77 are mounted under the pedals 76 for restoring the pedals 76. In addition, the oil pressure cylinders 77 serve to exercise the feet of the user when treading down the pedals 76. Therefore, the exercising cart not only can achieve an entertaining function, but also can achieve a treading exercising function with strength saved.

The above embodiment is only used to illustrate the present invention, not intended to limit the scope thereof. Many modifications of the above embodiment can be made without departing from the spirit of the present invention.

What is claimed is:

1. An exercising cart comprising:

a cart body;

a front wheel steering unit including a pair of front wheels;

a driving wheel unit;

a chain; a rear wheel unit including a pair of rear wheels;

the front wheel steering unit installed on a front section of the cart body;

the driving wheel unit installed on a middle section of the cart body;

the rear wheel unit mounted on a rear section of the cart body;

the rear wheel unit via the chain drivingly connected with the driving wheel unit;

a front side of the middle section of the cart body being elevated;

two pedal pivot seats each having a pivot hole and disposed on two sides of an upper end section thereof;

two oil pressure pivot seats, each having a pivot hole therethrough and respectively disposed on two sides of a rear face thereof and pivotally connected with one end of an oil pressure cylinder to the driving wheel unit;

two main supporting racks disposed on two sides of a rear portion of the middle section of the cart body;

a front side of each of the main supporting racks formed with a first guide rod through hole;

a rear side of each of the main supporting rack including a pivot rod through hole;

a transverse reinforcing beam disposed between the main supporting racks;

two subsidiary supporting racks disposed at a middle section of the transverse reinforcing beam;

a front side of each of the subsidiary supporting racks including a second guide rod through hole;

a rear side of an upper end face of the subsidiary supporting rack including a sprocket notch and two thread holes;

the rear wheel unit mounted on a rear section of the cart body;

a driven sprocket adapted to rotate a wheel shaft that is connected with said rear wheels of the rear wheel unit;

a base seat extending from a front end of a bottom side of a step face of a pedal, the base seat having a pivot hole at an end section thereof;

a pair of oil pressure pivot seats each including a pivot hole downwardly projecting from a middle section of the base seat for pivotally connecting with another end of the oil pressure cylinder of the driving wheel unit, the base seat of the pedal pivotally connected to the pedal pivot seats of the cart body;

the driving wheel unit comprising two bearings, a central pivot rod, the driving sprocket, two transmission gears, two fasteners, a sprocket cover, two pedals, two pedal pivot rods, two guide rods, a pair of the oil pressure cylinders and four oil pressure pivot rods, each of two ends of the central pivot rod including a locking thread section, the driving sprocket comprising at least one fly wheel, the transmission gears mounted on two sides of an axial center of the driving sprocket via the fly wheels, the bearings positioned at outer end sections of the transmission gears, the fasteners each comprising locking holes;

an arch rack positioned behind the oil pressure pivot seats, the arch rack comprising a central guide arch slot;

the driving sprocket of the driving wheel unit supported in the sprocket notches of the two subsidiary supporting racks of the cart body;

the fasteners and the sprocket cover locked together to cover the driving sprocket;

the central rod positioned through the pivot rod through hole of the cart body and the driving sprocket and the two transmission gears;

the guide rod positioned through the guide rod through hole of the main supporting rack and through the central guide arch slot and fixed at the guide rod through hole of the subsidiary supporting rack; and the chain positioned between the driving sprocket of the driving wheel unit and the driven sprocket of the rear wheel unit.

* * * * *